(12) United States Patent
Utagaki et al.

(10) Patent No.: US 7,621,087 B2
(45) Date of Patent: *Nov. 24, 2009

(54) INORGANIC BOARD AND METHOD FOR MANUFACTURING THEREOF

(75) Inventors: Kazuo Utagaki, Nagoya (JP); Tadashi Sugita, Nagoya (JP)

(73) Assignee: Nichiha Corporation, Aichi (JP)

( * ) Notice: Subject to any disclaimer, the term of this patent is extended or adjusted under 35 U.S.C. 154(b) by 623 days.

This patent is subject to a terminal disclaimer.

(21) Appl. No.: 11/215,964

(22) Filed: Aug. 30, 2005

(65) Prior Publication Data

US 2006/0075931 A1 Apr. 13, 2006

(30) Foreign Application Priority Data

Aug. 31, 2004 (JP) .............................. 2004-251708

(51) Int. Cl.
*E04C 1/00* (2006.01)
(52) U.S. Cl. ...................... 52/309.17; 52/344; 106/692; 106/713; 106/724; 106/730; 106/737
(58) Field of Classification Search ................. 106/713, 106/724, 737, 730, 692; 52/309.17, 344; 428/404
See application file for complete search history.

(56) References Cited

U.S. PATENT DOCUMENTS

| | | | | |
|---|---|---|---|---|
| 4,101,335 A | * | 7/1978 | Barrable | ..................... 106/644 |
| 5,945,044 A | * | 8/1999 | Kawai et al. | ............. 264/37.29 |
| 6,138,430 A | * | 10/2000 | Van Acoleyen et al. | .. 52/745.19 |
| 6,572,697 B2 | * | 6/2003 | Gleeson et al. | ............. 106/705 |
| 2003/0205172 A1 | * | 11/2003 | Gleeson et al. | ............. 106/679 |
| 2007/0186822 A1 | * | 8/2007 | Utagaki et al. | ............... 106/805 |
| 2007/0245930 A1 | * | 10/2007 | Utagaki et al. | ............... 106/716 |
| 2007/0246864 A1 | * | 10/2007 | Utagaki et al. | ............... 264/333 |
| 2007/0261607 A1 | * | 11/2007 | Utagaki et al. | ............... 106/805 |
| 2007/0277472 A1 | * | 12/2007 | Sinclair | ....................... 52/605 |
| 2008/0072795 A1 | * | 3/2008 | Utagaki et al. | ............... 106/731 |
| 2008/0072796 A1 | * | 3/2008 | Utagaki et al. | ............... 106/731 |
| 2008/0072797 A1 | * | 3/2008 | Utagaki et al. | ............... 106/731 |
| 2008/0157428 A1 | * | 7/2008 | Utagaki et al. | |
| 2008/0178771 A1 | * | 7/2008 | Utagaki et al. | |

* cited by examiner

*Primary Examiner*—Paul Marcantoni
(74) *Attorney, Agent, or Firm*—Cooper & Dunham, LLP

(57) ABSTRACT

The object of the present invention is to provide an inorganic board which has high mechanical strength, much improved dimensional stability, freezing and fusion resistance. To attain said object the present invention provides an inorganic board made of a cured material being a raw material mixture containing a cementitious inorganic material, a silica containing material, a woody reinforcement, and a water soluble synthetic resin, wherein the mass ratio of said cementitious inorganic material and said silica containing material is set to be in the range of between 35:65 and 45:55, to promote the hardening reaction of said inorganic board, and to reduce the unreacted materials, solving the problem of the retardation of the cement hardening by said water soluble synthetic resin.

5 Claims, No Drawings

INORGANIC BOARD AND METHOD FOR MANUFACTURING THEREOF

FIELD OF THE INVENTION

The present invention relates to an inorganic board containing a water soluble synthetic resin, and a method for the manufacturing thereof.

BACKGROUND OF THE INVENTION

Hithereto asbestos has been used as a reinforcement for an inorganic board, but environmental contamination due to the scattering of fine asbestos powder has become a serious problem, therefore, instead of asbestos, wood flake, wood fiber, and the like have been used as said reinforcement.

Nevertheless, the inorganic board in which said woody reinforcement is used has problems in that said inorganic board lacks mechanical strength and has poor freezing and fusion resistance.

To solve said problems, it is proposed that polyvinylalcohol be added to a mixture of said woody reinforcement and cement.

Said polyvinylalcohol acts as an adhesive in the inner structure of the inorganic board and prevents the drying of the surface of said inorganic board through its water holding property during curing in the autoclave and ensures uniform and smooth curing of the board in an autoclave, by making the water content of the papered sheet uniform.

| Patent Literature 1 | U.S. Pat. No. 3,245,487 |
| Patent Literature 2 | Tokkaihei 6-329457 |
| Patent Literature 3 | Tokkaihei 5-124845 |

DISCLOSURE OF THE INVENTION

Problem to be Solved in the Invention

As described above the mechanical strength of said inorganic board is improved by the addition of polyvinylalcohol, but there is a problem in that when the water soluble synthetic resin such as polyvinylalcohol is dissolved in the water of raw material slurry, said water soluble synthetic resin acts as a protective colloid, retarding the hardening reaction of said cement by covering the surface of said cement particles.

Accordingly, the object of the invention is to avoid the retardation of the hardening reaction of cement when said water soluble synthetic resin is added to the raw material mixture.

Means to Solve Problem

To solve said problem, the present invention provides an inorganic board made of a cured material being a raw material mixture containing a cementitious inorganic material(C), a silica containing material(S), a woody reinforcement, and a water soluble synthetic resin, wherein the mass ratio of said cementitious inorganic material(C) and said silica containing material(S) is set to be in the range of between 35:65 and 45:55, and further provides a method for manufacturing an inorganic board comprising the dispersing of a raw material mixture containing a cementitious inorganic material(C), a silica containing material(S), a woody reinforcement, and a water soluble synthetic resin, in water, to prepare a raw material slurry, then making said raw material slurry into a mat sheet, and then pressing and curing said mat sheet in an autoclave at a temperature higher than 150° C., wherein the mass ratio of said cementitious inorganic material(C) and said silica containing material(S) is set to be in the range of between 35:65 and 45:55.

It is preferable that said water soluble synthetic resin used in said raw material mixture is powdery polyvinylalcohol whose saponification value is higher than 98 molar %, and that said polyvinylalcohol is added to said raw material mixture in an amount of between 0.25 to 1.25% by mass, and further it is preferable that the CSF of said woody reinforcement used in said raw material mixture is below 500 ml, and that the content of said woody reinforcement is in the range of between 5 and 10% by mass.

Effect of the Invention

In the present invention, the mass ratio of said cementitious inorganic material (C) and said silica containing material (S) is set to be in the range of between 35:65 and 45:55 so that the hardening reaction of said inorganic board is promoted, reducing the amount of unreacted C or S component, and as a result, the hardening reaction of said inorganic board does not slow even when said water soluble synthetic resin is added to said raw material mixture, providing an inorganic board having a high mechanical strength and an excellent freezing and fusion resistance.

PREFERRED EMBODIMENT

The present invention is described precisely below.

[Woody Reinforcement]

Said woody reinforcement used in the present invention, may include such as wood powder, wood wool, wood flake, wood fiber, woody pulp, wood fiber bundle, strand, pulp made of conifer, broadleaf tree, paper scrap, or the like and two or more kinds of said woody reinforcement may be mixed together and further, lignocellulose such as bamboo fiber, hemp fiber, bagasse, chaff, rice straw or the like may be mixed into said woody reinforcement. A preferable woody reinforcement, for instance, is an unbleached conifer pulp (NUKP) or a bleeched conifer pulp (NBKP) having a C.S.F. (Canadian Standard Freeness) of under 500 ml.

[Cementitious Inorganic Material]

Said cementitious inorganic material used in the present invention includes such as portland cement, blast furnace slag cement, silica cement, fly ash cement, alumina cement, or the like.

[Silica Containing Material]

In the present invention, said silica containing material is used together with said cementitious inorganic material to promote the hardening reaction of said cementitious inorganic material. Said silica containing material may include such as silica powder, silica sand, silica stone powder, water glass, silica fume, shirasu balloon, pearlite, diatomaceous earth, dolomite or the like.

[Water Soluble Synthetic Resin]

Said water soluble synthetic resin used in the present invention includes such as polyvinylalcohol (PVA), caroboxy methyl cellulose (CMC), methyl cellulose (MC), ethyl hydroxy ethyl cellulose (EHEC), polyethyleneoxide (PEO), polyvinylether (PVE), starch, starch derivatives, gelatin, casein, albumen, soybean protein, Arabia gum, tragacanth-gum, or the like.

Said water soluble synthetic resin acts as an adhesive in the inner structure of said inorganic board, improving the interlaminer adhesive property, the mechanical strength, and the freezing and fusion resistance of said board. Further, said water soluble synthetic resin has a water holding property to prevent the drying of the surface of said board during curing in the autoclave, making the water content in the whole of said board uniform, resulting in the hardening reaction of said board during curing in the autoclave proceeding uniformly without partial hardening.

Accordingly in a case where said water soluble synthetic resin is added to said raw material mixture, its mechanical strength, freezing and fusion resistance, and the like may be improved.

A preferable water soluble synthetic resin is a powdery polyvinylalcohol whose saponification value is higher than 98 molar %. Said powdery polyvinylalcohol whose saponification value is higher than 98 molar % is insoluble, and only swells in water at room temperature, so that said polyvinylalcohol does not dissolve in the water of said raw material slurry at room temperature, and as a result, the amount of polyvinylalcohol lost during the sheet making process may be reduced, so that the yield of said polyvinylalcohol does not degrade, and the viscocity of said slurry does not increase, and accordingly, the sheet making effectiveness, namely the filtrating workability does not degrade.

Said powdery polyvinylalcohol may dissolve in the water contained in the papered sheet at a high temperature during the curing process in the autoclave, but since the water content of said papered sheet is low, most of said powdery polyvinylalcohol remains in said inorganic board in balloon-like state in which the water is absorbed, and even in the final product, a lot of polyvinylalcohol balloons remain, to give a cushioning property to the inner structure of said board through said balloon's shape effect, absorbing and relaxing the internal stress generated by the freezing of said board to improve further greatly its freezing and fusion resistance.

Still further, since most of said polyvinylalcohol remains in said papered sheet in a balloon-like state, so that said polyvinylalcohol is difficult to cover cement particles as a protective colloid, resulting in said polyvinylalcohol having little effect on the hardening of said cement.

[Other Components]

Other components besides those described above may be used as the raw materials of said inorganic board of the present invention.

Said components may be an inorganic fiber such as sepiolite, wollastonite, mica, glass fiber, whisker, or the like, a cement hardening promoter such as calcium chloride, magnesium chloride, potassium sulfate, calcium sulfate, magnesium sulfate, aluminum sulfate, sodium aluminate, potassium aluminate, calcium formate, calcium acetate, calcium acrylate, water glass, or the like, a mineral powder such as vermiculite, bentonite, or the like, a waterproofing agent or water repellent agent such as wax, paraffin, a silicone surface active agent, or the like, an expandable, or expanded thermoplastic bead, a foamed plastic, or the like.

Said illustration does not limit the scope of the present invention.

[Composition of Inorganic Board]

In said raw material mixture of said inorganic board of the present invention, the mass ratio (C:S) of said cementitious inorganic material(C) and silica containing material(S), to promote the hardening reaction of said cementitious material, may be in the range of between 35:65 and 45:55. In said raw material mixture, said woody reinforcement is preferably contained in an amount of between 5 and 10% by mass, said cementitious material(C) is preferably contained in an amount of between 25 and 45% by mass, said silica containing material(S) is preferably contained in an amount of between 45 and 65% by mass, said water soluble synthetic resin is preferably contained in an amount of between 0.25 and 1.25% by mass (as solid content respectively). In a case where said water soluble synthetic resin is contained in an amount of less than 0.25% by mass, the reinforcing effect of said water soluble synthetic resin is not sufficiently exercised, and in a case where said water soluble synthetic resin is contained in an amount of beyond 1.25% by mass, the improvement of the physical properties of said board is not adequate even if the C/S is set to be in the range of between 35/65 and 45/55.

[Manufacture of Inorganic Board]

Said inorganic board is manufactured by a sheet making method. In said sheet making method, said cementitious inorganic material(C), said silica containing material(S), said woody reinforcing material, said water soluble synthetic resin, and the like are dispersed in water and mixed to prepare a raw material slurry, and the resulting slurry is made into a mat sheet by well known methods such as the flow-on method, long net method, Hatscheck method, or the like, and the resulting mat sheet is pressed preferably at a pressure higher than 20 MPa, and then cured in the autoclave preferably at a temperature higher than 150° C., and at a pressure higher than 0.4 MPa.

In this case, the solid content of said slurry is generally set to be in the range of between 5 and 15% by mass, and the papered sheets formed by the sheet making method are laminated to be a 6 to 10 layer structure by taking them up on a making roll, shaping a said mat sheet.

As described above, to solve of the problem of the retarding of said cement hardening by said water soluble synthetic resin in said raw material mixture, in the present invention, the mass ratio of said cementitious inorganic material(C) and said silica containing material(S) is set to be in the range of between 35:65 and 45:55.

In this range, the hardening reaction of said inorganic board proceeds smoothly, to markedly reduce the amounts of unreacted C component and unreacted S component, and a lot of cardhouse shaped tobamolite crystal is produced, resulting in the effect of said water soluble synthetic resin for retardating the cement hardening being reduced, remarkably improving the mechanical strength and dimensional stability of said board, and further improving its freezing and fusion resistance. As a result, said inorganic board of the present invention acquires a high mechanical strength, much improved dimensional stability, freezing and fusion resistance.

In a case of the C/S<35/65, a lot of unreacted S component remains, reducing the amount of tobamolite crystal produced, and as a result said board has a poor freezing and fusion resistance, but in a case of the C/S>45/55, a lot of cement hydrate which has not been hardened by the calcium silicate reaction is produced, resulting in said board being brittle, with a reduced cracking resistance.

On the surface of said inorganic board manufactured as described above, if desirable, an organic solvent solution type acrylic resin paint, aqueous emulsion type acrylic resin paint, urethane group resin paint, silicon group resin paint, or the like is undercoated, and further, a paint the same as those described above is used as a middle coat over said undercoating, and further, an organic solvent solution type acrylic resin paint, aqueous emulsion type acrylic resin paint, organic solvent solution type silicon-acryl group resin paint, or the like is coated as surface coating.

The present invention is further precisely described by the EXAMPLES described below, but said EXAMPLES do not limit the scope of the present invention.

EXAMPLES 1 to 5, COMPARISONS 1 to 5

Raw material mixtures having compositions as shown in Table 1 were prepared as the raw materials for said inorganic board.

TABLE 1

| Composition (% by mass) | Example 1 | Example 2 | Example 3 | Example 4 | Example 5 | Comparison 1 | Comparison 2 | Comparison 3 | Comparison 4 | Comparison 5 |
|---|---|---|---|---|---|---|---|---|---|---|
| Cement (C) | 31.5 | 31.5 | 31.5 | 36 | 40.5 | 54 | 36 | 36 | 36 | 54 |
| Silica sand (S) | 58.5 | 58.5 | 58.5 | 54 | 49.5 | 36 | 54 | 54 | 54 | 36 |
| Pulp | 5 | 5 | 5 | 5 | 5 | 5 | 5 | 5 | 5 | 5 |
| Wollastonite | 5 | 5 | 5 | 5 | 5 | 5 | 5 | 5 | 5 | 5 |
| Powdering PVA | 0.3 | 0.75 | 1.2 | 0.75 | 0.75 | 0 | 0 | 0.1 | 1.5 | 0.75 |
| Mass ratio C/S | 35/65 | 35/65 | 35/65 | 40/60 | 45/55 | 60/40 | 40/60 | 40/60 | 40/60 | 60/40 |

*1: Saponification value 98 molar %, an admixture.

Each raw material mixture was dispersed in water to prepare a raw material slurry whose solid content was 10% by mass, and said raw material slurry was made into sheets on felt to form a mat sheet. The resulting mat sheet was then pressed at 23 MPa, and primarily cured at 50° C. for 24 hours, then further cured at 170° C., 0.7 MPa for 7 hours in the autoclave, to prepare inorganic board samples.

Testing of specific gravity in an absolutely dry state, bending strength, elongation ratio through water absorption, contraction ratio through moisture effusion, micro-cracking, freezing and fusion resistance, was carried out on each inorganic board sample.

The results are shown in Table 2.

to each inorganic board sample in an amount of between 0.25% and 1.25% by mass, with the C/S mass ratio of each inorganic board sample being set to be in the range of between 35:65 and 45:55, so that satisfying results in the areas of mechanical strength, dimensional stability, freezing and fusion resistance, and cracking resistance were obtained, while the inorganic board sample of COMPARISON 1 to which no powdery PVA was added, and in which the C/S was set to be greater than 45/55 (60/40), has degraded cracking resistance, the inorganic board sample of COMPARISON 2 in which the C/S was set to be within the range of between 35/65 and 45/55 (40/60), but to which no powdery PVA was added, has poor freezing and fusion resistance, the inorganic board sample of COMPARISON 3, in which powdery PVA was contained in an amount below 0.25% by mass(0.1% by mass), even with its C/S mass ratio set to be 40/60, has a poor freezing and fusion resistance, the inorganic board sample of COMPARISON 4, in which powdery PVA was contained in an amount beyond 1.25% by mass (1.5% by mass) has substantially the same properties as those of inorganic board samples of each EXAMPLE, though the raw materials costs may increase, and the inorganic board sample of COMPARISON 5 whose C/S was greater than 45/55 (60/40) has

TABLE 2

| | Example 1 | Example 2 | Example 3 | Example 4 | Example 5 | Comparison 1 | Comparison 2 | Comparison 3 | Comparison 4 | Comparison 5 |
|---|---|---|---|---|---|---|---|---|---|---|
| Specific gravity in absolutely dry state | 1.51 | 1.49 | 1.46 | 1.5 | 1.51 | 1.58 | 1.54 | 1.54 | 1.47 | 1.52 |
| Bending strength (N/mm2) *1 | 23 | 21 | 19 | 22 | 23 | 28 | 25 | 25 | 21 | 25 |
| Elongation ratio through water absorption (%) *2 | 0.18 | 0.18 | 0.18 | 0.18 | 0.18 | 0.19 | 0.18 | 0.18 | 0.18 | 0.19 |
| Contraction ratio through moisture effusion (%) *3 | 0.18 | 0.17 | 0.17 | 0.17 | 0.18 | 0.18 | 0.18 | 0.18 | 0.17 | 0.18 |
| Microcracking test *4 | 4 | 4 | 5 | 4 | 4 | 1 | 4 | 4 | 4 | 1 |
| Freezing and fusion resistance (%) *5 | 2.5 | 1.8 | 1 | 1.4 | 1.2 | 1.7 | 3.5 | 3.2 | 1.2 | 1 |

*1 According to JIS A 1408
*2 After controlling the humidity at 60° C. for 3 days, each sample was dipped in water for 8 days
*3 After controlling the humidity at 20° C., 60% RH for 10 days, each sample was dried at 80° C. for 10 days
*4 After neutralizing for 4 days, the number of cycles until cracking is generated is determined, wherein 1 cycle consists of 3 repetitions of the following process: water absorption for 7 hours→then, drying at 120° C. for 17 hours.
*5 ASTM B method: after 300 cycles, swelling ratio of the thickness of the board.

As shown in Table 2, in EXAMPLES 1 to 5, a powdery PVA, whose saponification value was 98 molar %, was added degraded cracking resistance, even though it contained powdery PVA.

POSSIBILITY OF INDUSTRIAL UTILITY

The inorganic board of the present invention has high mechanical strength, high dimensional stability, and further, excellent freezing and fusion resistance, so that said inorganic board is extremely useful as a building board, used for such as siding.

The invention claimed is:

1. An inorganic board made of a cured material being a raw material mixture containing a cementitious inorganic material, a silica containing material, a woody reinforcement, and a powdery polyvinylalcohol whose saponification value is higher than 98 molar %, wherein the mass ratio of said cementitious inorganic material and said silica containing material is set to be in the range of between 35:65 and 45:55 and said polyvinylalcohol is added to said raw material mixture in an amount of between 0.25 and 1.25% by mass.

2. An inorganic board in accordance with claim 1, wherein the Canadian Standard Freeness of said woody reinforcement used in said raw material mixture is below 500 ml, and the content of said woody reinforcement is in the range of between 5 and 10% by mass.

3. An inorganic board made of a cured material being a raw material mixture containing a cementitious inorganic material selected from the group consisting of Portland cement, blast furnace slag cement, silica cement, fly ash cement, and alumina cement, a silica containing material selected from the group consisting of silica powder, silica sand, silica stone powder, water glass, silica fume, shirasu balloon, pearlite, diatomaceous earth, and dolomite, a woody reinforcement, and a a powdery polyvinylalcohol whose saponification value is higher than 98 molar %, wherein the mass ratio of said cementitious inorganic material and said silica containing material is set to be in the range of between 35:65 and 45:55 and said polyvinylalcohol is added to said raw material mixture in an amount of between 0.25 and 1.25% by mass.

4. An inorganic board made of a cured material being a raw material mixture containing Portland cement, silica sand, a woody reinforcement, and a powdery polyvinylalcohol whose saponification value is higher than 98 molar %, wherein the mass ratio of said Portland cement and said silica sand is set to be in the range of between 35:65 and 45:55 and said polyvinylalcohol is added to said raw material mixture in an amount of between 0.25 and 1.25% by mass.

5. An inorganic board in accordance with claim 4, wherein the Canadian Standard Freeness of said woody reinforcement used in said raw material mixture is below 500 ml, and the content of said woody reinforcement is in the range of between 5 and 10% by mass.

* * * * *